US011591428B2

(12) United States Patent
Zhao et al.

(10) Patent No.: US 11,591,428 B2
(45) Date of Patent: Feb. 28, 2023

(54) SYNTHESIS OF LOW MOLECULAR WEIGHT TAPERED STYRENE-BUTADIENE COPOLYMER AND ITS USE IN TIRES

(71) Applicant: Bridgestone Corporation, Chuo-ku (JP)

(72) Inventors: Wei Zhao, Guangzhou (CN); Yaohong Chen, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 264 days.

(21) Appl. No.: 16/958,457

(22) PCT Filed: Dec. 19, 2018

(86) PCT No.: PCT/US2018/066445
§ 371 (c)(1),
(2) Date: Jun. 26, 2020

(87) PCT Pub. No.: WO2019/133365
PCT Pub. Date: Jul. 4, 2019

(65) Prior Publication Data
US 2021/0054128 A1  Feb. 25, 2021

Related U.S. Application Data

(60) Provisional application No. 62/610,436, filed on Dec. 26, 2017.

(51) Int. Cl.
C08F 236/10 (2006.01)
B60C 1/00 (2006.01)
C08F 2/06 (2006.01)
C08K 3/36 (2006.01)
C08L 7/00 (2006.01)
C08L 9/06 (2006.01)
C08L 91/00 (2006.01)

(52) U.S. Cl.
CPC .......... *C08F 236/10* (2013.01); *B60C 1/0016* (2013.01); *C08F 2/06* (2013.01); *C08K 3/36* (2013.01); *C08L 7/00* (2013.01); *C08L 9/06* (2013.01); *C08L 91/00* (2013.01); *C08F 2800/20* (2013.01)

(58) Field of Classification Search
CPC ...... C08F 236/10; C08F 2/06; C08F 2800/20; C08F 236/06; B60C 1/0016; B60C 1/00; C08K 3/36; C08L 7/00; C08L 9/06; C08L 91/00
See application file for complete search history.

(56) References Cited

U.S. PATENT DOCUMENTS

| | | |
|---|---|---|
| 3,976,721 A | 8/1976 | Satake et al. |
| 4,075,285 A | 2/1978 | Tabana et al. |
| 4,839,425 A | 6/1989 | Mawatari |
| 5,272,207 A | 12/1993 | Hall |
| 5,358,981 A | 10/1994 | Southwick |
| 5,393,841 A | 2/1995 | Himes |
| 5,614,568 A | 3/1997 | Mawatari |
| 5,614,579 A | 3/1997 | Roggeman |
| 5,863,704 A | 1/1999 | Sakurai |
| 6,022,924 A | 2/2000 | Akao |
| 6,191,226 B1 | 2/2001 | Matsuda |
| 6,306,514 B1 | 10/2001 | Weikel |
| 6,472,464 B1* | 10/2002 | Morita ............... C08F 236/10 524/505 |
| 6,610,798 B1 | 8/2003 | Bleijenberg |
| 2002/0061981 A1 | 5/2002 | Donald et al. |
| 2002/0107316 A1 | 8/2002 | Bice et al. |
| 2003/0039412 A1 | 2/2003 | Rodick |
| 2004/0034180 A1 | 2/2004 | Petela |
| 2006/0111510 A1 | 5/2006 | Tanaka |
| 2008/0107852 A1 | 5/2008 | Rubb |
| 2008/0210463 A1 | 9/2008 | Maas |
| 2008/0248227 A1 | 10/2008 | Sumimoto |
| 2009/0011667 A1 | 1/2009 | Hayward |
| 2010/0006442 A1 | 1/2010 | Lochtman |
| 2010/0068615 A1 | 3/2010 | Kaito |
| 2010/0072416 A1 | 3/2010 | Fujioka |
| 2010/0105836 A1 | 4/2010 | Mawatari |
| 2010/0206443 A1* | 8/2010 | Halasa ............... C08F 236/10 526/66 |
| 2011/0040038 A1 | 2/2011 | Arai |
| 2011/0160364 A1 | 6/2011 | Toyohara |
| 2014/0107286 A1 | 4/2014 | Hamann et al. |
| 2014/0155523 A1 | 6/2014 | Hernandez-Zamora et al. |

FOREIGN PATENT DOCUMENTS

| | | |
|---|---|---|
| EP | 0254766 A1 | 2/1988 |
| JP | H062399089 A | 8/1994 |
| WO | 2008015169 A2 | 2/2008 |

OTHER PUBLICATIONS

Donkai, et al.; Thin-Layer Chromatographic Identification of Chain Architectures of Styrene-Butadiene Copolymers; Polymer Journal, 1975, vol. 7, No. 5, pp. 577-583.

Halasa, et al.; Synthesis of Random or Tapered Solution Styrene-Butadiene Copolymers in the Presence of Sodium Dodecylbenzene Sulfonate as a Polar Modifier; J. Appl. Polymer Science, 2013, DOI: 10.1002/PP.37750.

Diaz de Leon et al.; Phenomenon of Phase Inversion in High Impact Polystyrene: Physico-Chemical, Rheological and Morphological Study in the Presence of Chain Transfer Agent and Using Different Tapered Block Copolymers as the Prescursor Rubber; Polymer Engineering and Science, 2010, www.interscience.wiley.com.

(Continued)

*Primary Examiner* — Doris L Lee
(74) *Attorney, Agent, or Firm* — Meredith E. Hooker; J. Gregory Chrisman

(57) ABSTRACT

Methods are described for the preparation of tapered styrene-butadiene copolymers for use as partial or full oil replacements in rubber compositions. The resulting rubber compositions exhibit improved storage modulus and wear resistance properties.

20 Claims, No Drawings

(56) References Cited

OTHER PUBLICATIONS

Moctezuma, et al.; Tapered Block Copolymers of Styrene and Butadiene: Synthesis, Structure, and Properties; American Chemical Society, 1998, Applications of Anionic Polymerization Research; ACS Symposium Series.

Tanaka, et al., Structural Characterization of Diene Block Copolymers by GPC and Ozonolysis-GPC Measurements, 1996, Rubber Chemistry and Technology, vol. 60, pp. 24-36.

Moctezuma, et al., Tapered Block Copolymers of Styrene and Butadiene: Synthesis, Structure and Properties; 1998, American Chemical Society, Chapter 10, pp. 129-139.

\* cited by examiner

SYNTHESIS OF LOW MOLECULAR WEIGHT TAPERED STYRENE-BUTADIENE COPOLYMER AND ITS USE IN TIRES This application is a national stage application of PCT/US2018/066445 filed on Dec. 19, 2018, which claims the benefit of U.S. Provisional Application Ser. No. 62/610,436 filed on Dec. 26, 2017, which are incorporated herein by reference in their entirety.

TECHNICAL FIELD

The present disclosure relates to low molecular weight styrene-butadiene copolymers and methods for using the same as full or partial oil replacements in rubber compounds.

BACKGROUND

Wear and storage modulus (G') are properties of rubber that have an impact on tire performance. Generally, as the temperature of a tire increase, G' decreases. As a result, there may be a decrease in handling.

Inorganic fillers, such as silica, impart improved wet traction and improved snow traction when used within tire treads. Mixing silica into a tire stock, however, is difficult because silica particles agglomerate and therefore they are not easily dispersed. In response, processing and dispersing aids, such as processing oils, are used during compounding. Unfortunately, the use of these processing and dispersing aids may enhance the decrease in modulus that is typically observed at high temperatures.

Because inorganic fillers are technologically useful, there is a need to overcome the difficulties associated with the change of G' at elevated temperatures in tire treads containing inorganic fillers.

It is an objective of the present disclosure to alleviate or overcome one or more difficulties related to the prior art. It has been found that low molecular weight styrene-butadiene copolymers can be used as a partial or full oil replacement in rubber compounds to provide enhanced wear improvement and storage modulus (G').

SUMMARY

In a first aspect, disclosed is a low molecular weight styrene butadiene copolymer that includes a total styrene content of 20 to 30 percent by weight of the styrene-butadiene copolymer, a total butadiene content of 70 to 80 percent by weight of the styrene-butadiene copolymer, a content of styrene sequences having greater than 3 styrene units is greater than 30 weight percent of the total styrene content, and a content of styrene sequences having greater than 10 styrene units is less than 20 weight percent of the total styrene content.

In an example of aspect 1, the total styrene content is 22 to 27 percent by weight of the styrene-butadiene copolymer and the total butadiene content is 73 to 78 percent by weight of the styrene-butadiene copolymer.

In another example of aspect 1, the content of styrene sequences having greater than 3 styrene units is 35 to 50 weight percent of the total styrene content.

In another example of aspect 1, the content of styrene sequences having greater than 10 styrene units is 8 to 18 weight percent of the total styrene content.

In another example of aspect 1, the styrene-butadiene copolymer has a number average molecular weight of 30,000 to 80,000.

In another example of aspect 1, the styrene-butadiene copolymer has a number average molecular weight of less than 70,000.

In another example of aspect 1, the styrene-butadiene copolymer has a glass transition temperature of −80° C. to −70° C.

In another example of aspect 1, the styrene-butadiene copolymer has a molecular weight distribution (Mw/Mn) of 1.0 to 1.2.

In another example of aspect 1, the styrene-butadiene copolymer has a molecular weight distribution (Mw/Mn) of 1.05 to 1.13.

In another example of aspect 1, the copolymer is prepared by copolymerizing styrene and butadiene in a hydrocarbon solvent in the presence of an organolithium initiator and sodium dodecylbenzenesulfonate.

The first aspect may be provided alone or in combination with any one or more of the examples of the first aspect discussed above.

In a second aspect, there is a rubber composition for a tire. The composition includes a rubber component, 30 to 100 phr of a reinforcing filler, up to 10 phr of a process oil, and 1 to 15 phr of a low molecular weight styrene-butadiene copolymer that includes a total styrene content of 20 to 30 percent by weight of the styrene-butadiene copolymer, a total butadiene content of 70 to 80 percent by weight of the styrene-butadiene copolymer, a content of styrene sequences having greater than 3 styrene units is greater than 30 weight percent of the total styrene content, and a content of styrene sequences having greater than 10 styrene units is less than 20 weight percent of the total styrene content. The rubber composition has a storage modulus G' measured at 0.1% strain and 30° C. of 4 to 15 MPa.

In an example of aspect 2, the rubber composition has a storage modulus G' of 8 to 11 MPa.

The second aspect may be provided alone or in combination with the example of the second aspect discussed above.

In a third aspect, there is a first rubber composition for a tire. The first rubber composition includes a rubber component, 30 to 100 phr of a reinforcing filler, up to 10 phr of a process oil, and 1 to 15 phr of a low molecular weight styrene-butadiene copolymer that includes a total styrene content of 20 to 30 percent by weight of the styrene-butadiene copolymer, a total butadiene content of 70 to 80 percent by weight of the styrene-butadiene copolymer, a content of styrene sequences having greater than 3 styrene units is greater than 30 weight percent of the total styrene content, and a content of styrene sequences having greater than 10 styrene units is less than 20 weight percent of the total styrene content. The first rubber composition has a storage modulus G' at least 5% greater than a storage modulus G' of a second rubber composition having the same composition as the first rubber composition except for the styrene-butadiene copolymer.

In an example of aspect 3, the storage modulus G' of the first rubber composition is at least 20% greater than the storage modulus G' of the second rubber composition.

In another example of aspect 3, the storage modulus G' of the first rubber composition is at least 40% greater than the storage modulus G' of the second rubber composition.

The third aspect may be provided alone or in combination with any one or more of the examples of the third aspect discussed above.

In a fourth aspect, there is a rubber composition for a tire that includes a rubber component, 30 to 100 phr of a reinforcing filler, up to 10 phr of a process oil, and 1 to 15 phr of a low molecular weight styrene-butadiene copolymer that includes a total styrene content of 20 to 30 percent by weight of the styrene-butadiene copolymer, a total butadiene content of 70 to 80 percent by weight of the styrene-butadiene copolymer, a content of styrene sequences having greater than 3 styrene units is greater than 30 weight percent of the total styrene content, and a content of styrene sequences having greater than 10 styrene units is less than 20 weight percent of the total styrene content. The rubber composition has a wear rate measured at 50 m/min and 35 N of 0.07 to 0.09 mg/m.

In an example of aspect 4, the wear rate is 0.075 to 0.085 mg/m.

The fourth aspect may be provided alone or in combination with the example of the fourth aspect discussed above.

In a fifth aspect, there is a first rubber composition for a tire. The first rubber composition includes a rubber component, 30 to 100 phr of a reinforcing filler, up to 10 parts by weight of a process oil, and 1 to 15 phr of a low molecular weight styrene-butadiene copolymer that includes a total styrene content of 20 to 30 percent by weight of the styrene-butadiene copolymer, a total butadiene content of 70 to 80 percent by weight of the styrene-butadiene copolymer, a content of styrene sequences having greater than 3 styrene units is greater than 30 weight percent of the total styrene content, and a content of styrene sequences having greater than 10 styrene units is less than 20 weight percent of the total styrene content. The first rubber composition has a wear resistance at least 5% greater than a wear resistance of a second rubber composition having the same composition as the first rubber composition except for the styrene-butadiene copolymer.

In an example of aspect 5, the wear resistance of the first rubber composition is 15% greater than the wear resistance of the second rubber composition.

The fifth aspect may be provided alone or in combination with the example of the fifth aspect discussed above.

In a sixth aspect, there is a rubber composition for a tire. The rubber composition includes a rubber component, 30 to 100 phr of a reinforcing filler, up to 10 phr of a process oil, and 1 to 15 phr of a styrene-butadiene copolymer that includes a total styrene content of 20 to 30 percent by weight of the styrene-butadiene copolymer, a total butadiene content of 70 to 80 percent by weight of the styrene-butadiene copolymer, a content of styrene sequences having greater than 3 styrene units is greater than 30 weight percent of the total styrene content, and a content of styrene sequences having greater than 10 styrene units is less than 20 weight percent of the total styrene content. The styrene-butadiene copolymer has a number average molecular weight of 30,000 to 80,000.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than 25. In an example, such a range defines independently at least 5, and separately and independently, not more than 25.

The present disclosure relates to low molecular weight styrene-butadiene copolymers having specified amounts of styrene and butadiene and the use of such compounds as full or partial oil replacements in rubber compositions to enhance wear and storage modulus properties.

Embodiments disclosed herein relate to styrene-butadiene copolymers having gradients in styrene and block styrene content. In one embodiment, the styrene-butadiene copolymers have total styrene contents of 20 to 30 percent by weight and total butadiene contents of 70 to 80 percent by weight. In other embodiments, the styrene-butadiene copolymers have total styrene contents of 22 to 28 percent by weight or 24 to 26 percent by weight and total butadiene contents of 72 to 78 percent by weight or 74 to 76 percent by weight.

In one or more embodiments, the styrene-butadiene copolymers have a content of styrene sequences having greater than three styrene units of greater than 10 weight percent of the total styrene content. In other embodiments, the styrene-butadiene copolymers have a content of styrene sequences having greater than three styrene units of greater than 20, 30, 40, or 50 weight percent of the total styrene content. In further embodiments, the styrene-butadiene copolymers have a content of styrene sequences having greater than three styrene units of 35 to 50 weight percent of the total styrene content.

In one or more embodiments, the styrene-butadiene copolymers have a content of styrene sequences having greater than ten styrene units of less than 30 weight percent of the total styrene content. In other embodiments, the styrene-butadiene copolymers have a content of styrene sequences having greater than ten styrene units of less than 25, 20, 15, 10, or 5 weight percent of the total styrene content. In further embodiments, the styrene-butadiene copolymers have a content of styrene sequences having greater than ten styrene units of 8 to 18 weight percent of the total styrene content.

In one or more embodiments, 25 to 55 weight percent of the butadiene units of the styrene-butadiene copolymers have a cis-microstructure and 35 to 65 weight percent of the butadiene units of the styrene-butadiene copolymers have a trans-microstructure. In further embodiments, 30 to 50 weight percent, 35 to 45 weight percent, or 38 to 42 weight percent of the butadiene units of the styrene-butadiene copolymers have a cis-microstructure. In further embodiments, 40 to 60 weight percent, 45 to 55 weight percent, or 48 to 52 weight percent of the butadiene units of the styrene-butadiene copolymers have a trans-microstructure.

In one or more embodiments, the number average molecular weight ($M_n$) of the styrene-butadiene copolymers can be from 20,000 to 100,000, 25,000 to 95,000, 30,000 to 90,000, 35,000 to 85,000, 40,000 to 80,000, 45,000 to 75,000, or 50,000 to 70,000 as determined by using gel permeation chromatography (GPC) calibrated with polystyrene standards and Mark-Houwink constants for the polymer in question. In one or more embodiments, the molecular weight distribution or polydispersity ($M_w/M_n$) of the styrene-butadiene copolymers can be less than 2.00, less than 1.90, less than 1.60, less than 1.50, less than 1.30, less than 1.10, less than 1.00, or less than 0.90.

In one or more embodiments, the glass transition temperature ($T_g$) of the styrene-butadiene copolymers can be from −100° C. to −50° C. In other embodiments, the $T_g$ of the styrene-butadiene copolymers can be from −95° C. to −65° C., −90° C. to −60° C., or −80° C. to −70° C.

In one or more embodiments, the low molecular weight styrene-butadiene copolymers are prepared by solution polymerization of styrene and butadiene monomers. In one or more embodiments, the low molecular weight styrene-butadiene copolymers may be prepared by reacting the monomers, an initiator, and a polar modifier in a solvent in a reaction vessel. The entirety of the monomer feed solution is charged into the reaction vessel. After a specified residence time in the reaction vessel, the reaction can be terminated by a polymer terminating agent. During the reaction process, the conditions in the reaction vessel are sufficient to maintain a substantially liquid phase under the conditions of the polymerization reaction. For example, the reaction conditions under which the polymerization proceeds (e.g., in the vessel) may be carried out include maintaining the temperature of the polymerization mixture within a range from 30° C. to 80° C., 40° C. to 70° C., or 50° C. to 60° C. In other examples, the polymerization can be carried out at a peak polymerization temperature of less than 120° C., less than 110° C., less than 100° C., less than 90° C., less than 80° C., less than 70° C., less than 60° C., or less than 50° C.

The polymerization time will generally range from about 30 minutes to 60 minutes to several hours, for example, 2 or 3 hours. Thus, the fresh monomers in the polymerization vessel can have an average residence time in the range of 30 minutes to 2 hours, and more preferably 30 minutes to 90 minutes before being reacted and/or exiting the vessel in a polymerization mixture.

The polymerization reaction product or mixture can be further processed as known in the art. The polymer product from the reaction mixture can be recovered by using techniques known in the art. For example, desolventization and drying techniques may be used (e.g., the polymer can be recovered by passing the reaction mixture through a heated screw apparatus, such as a desolventizing extruder, in which the volatile substances are removed by evaporation at appropriate temperatures (100° C. to 170° C.) and under atmospheric or sub-atmospheric pressure). This treatment serves to remove unreacted monomer as well as any low-boiling solvent. Alternatively, the polymer can also be recovered by subjecting the reaction mixture to steam desolventization, followed by drying the resulting polymer crumbs in a hot air tunnel. The polymer can also be recovered by directly drying the reaction mixture on a drum dryer.

Solution polymerization may be carried out in a hydrocarbon solvent, which can include one or more aromatic or alkane compounds. Preferably, any solvent in which both the monomers and the initiator are soluble may be used. Exemplary solvents are aromatic and aliphatic hydrocarbons including, but not limited to, hexane, heptane, pentane, octane, cyclohexane, cycloheptane, cyclopentane, methyl cyclohexane, benzene, and toluene.

Organolithium compounds may be utilized as initiators in the solution polymerizations. Suitable lithium initiators include organolithium compounds. The organolithium compounds generally used include alkyllithium compounds which can be represented by the formula: R—Li, wherein R represents a hydrocarbyl radical containing from 1 to about 20 carbon atoms. Generally, such organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

A polar modifier may be utilized in the solution polymerization to inhibit gelation. Suitable polar modifiers include N,N,N',N'-tetramethylethylenediamine (TMEDA) and sodium dodecylbenzenesulfonate (SDBS).

Exemplary polymer terminating agents include, but not limited to, water, lower alcohols containing 1 to 4 carbon atoms, and organic acids. Suitable lower alcohols for precipitation of the styrene-butadiene copolymers from the polymer cement include methanol, ethanol, isopropanol, n-propyl alcohol, and t-butyl alcohol. The polymer terminating agent may also contain butylated hydroxy toluene (BHT).

Rubber compositions that include embodiments of the disclosed styrene-butadiene copolymers can be cured in a conventional manner with known vulcanizing agents. For example, sulfur or peroxide-based curing systems may be employed. Also, see Kirk-Othmer, ENCYCLOPEDIA OF CHEMICAL TECHNOLOGY, 3$^{rd}$ Edition, Wiley Interscience, N.Y. 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, 2$^{nd}$ Edition, John Wiley & Sons, Inc., 1989, which are incorporated herein by reference. Vulcanizing agents may be used alone or in combination.

The rubber compositions and tire components may also include other compounding additives such as accelerators, oils, waxes, scorch inhibiting agents, and processing aids. Compositions containing synthetic rubbers can include antidegradants, processing oils, zinc oxide, optional tackifying resins, optional reinforcing resins, optional fatty acids, optional peptizers, and optional scorch inhibiting agents. The use of the disclosed styrene-butadiene copolymers can reduce or eliminate the need for ingredients such as processing oils. Accordingly, the rubber compositions of certain disclosed embodiments may be essentially devoid of processing oils, where "essentially devoid" refers to the absence of any amount that is conventionally required to impact compounding and curing.

Embodiments of rubber compositions and tire components that contain the disclosed styrene-butadiene copolymer will generally contain from 0.1 to 25 parts by weight of the styrene-butadiene copolymer per 100 parts by weight rubber (phr). Preferably, the rubber compositions and tire components will contain from about 0.2 to about 20 parts by weight phr, even more preferably from about 0.5 to about 17 parts by weight phr, and still more preferably from about 1 to about 15 parts by weight phr of the styrene-butadiene copolymer.

Fillers, such as carbon black, silica, or aluminum hydroxide, are typically employed in an amount from 1 to 100 parts by weight phr, and preferably from 20 to 90 parts by weight phr, and more preferably from 30 to 70 parts by weight phr.

Silica may optionally be used in an amount from 10 to 100 parts by weight phr, preferably from 15 to 90 parts by weight phr, and more preferably from 20 to 80 parts by weight phr.

Carbon black may optionally be used in an amount from 0.5 to 80 parts by weight phr, preferably from 1 to 40 parts by weight phr, and more preferably from 2 to 30 parts by weight phr.

Aluminum hydroxide may optionally be used in an amount from 1 to 25 parts by weight phr, preferably from 2 to 20 parts by weight phr, and more preferably from 5 to 15 parts by weight phr.

In another embodiment, aluminum hydroxide, silica, and carbon black are used in combination. In this embodiment, the silica:carbon black ratio is from 1:10 to 99:1, more preferably from 1:5 to 5:1, and even more preferably from 1:3 to 3:1. In another embodiment, the silica:aluminum hydroxide ratio is from 3:1 to 30:1, more preferably from 5:1 to 20:1, and even more preferably from 6:1 to 15:1.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. Embodiments of the low molecular weight styrene-butadiene copolymer are preferably added during preparation of the initial masterbatch. Once this initial masterbatch is prepared, the vulcanizing agents are blended into the composition. Rubber compounding techniques and the additives employed therein are generally known as disclosed in The Compounding and Vulcanization of Rubber, by Stevens in RUBBER TECHNOLOGY SECOND EDITION (1973 Van Nostrand Reihold Company). The mixing conditions and procedures applicable to silica-filled tire formulations are also well known as described in U.S. Pat. Nos. 5,227,425, 5,719,207, 5,717,022, as well as EP 0890606, all of which are incorporated herein by reference. The composition can then be processed into tire components according to ordinary tire manufacturing techniques including standard rubber curing techniques. Tire compositions containing embodiments of the disclosed low molecular weight styrene-butadiene copolymer preferably include tire treads. The compositions, however, can also be used to form other elastomeric tire components such as subtreads, black sidewalls, body ply skims, bead fillers and the like. Pneumatic tires can be made according to U.S. Pat. Nos. 5,866,171, 5,876,527, 5,931,211, and 5,971,046, which are incorporated herein by reference.

The polymers of this disclosure are particularly useful in preparing rubber compositions that can be used to manufacture tire components. Rubber compounding techniques and the additives employed therein are generally disclosed in The Compounding and Vulcanization of Rubber, in Rubber Technology ($2^{nd}$ Ed. 1973).

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular rubbers, fillers, and other ingredients (e.g., functionalizing agent, curative, etc.) utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

In the following examples, the number average (Mn) and weight average (Mw) molecular weights of the polymer samples were determined by gel permeation chromatography. The gel permeation chromatography instrument was equipped with a differential refractive index detector and an ultraviolet absorption detector. The gel permeation chromatography ultraviolet/refractive index ratio, which is the ratio of the ultraviolet detector signal to the refractive index detector signal, was used to calculate the percent functionality of the polymer samples by referencing the gel permeation chromatography ultraviolet/refractive index ratio of the functionalized cis-1,4-polybutadiene to the ultraviolet/refractive index ratio of a functionalized polybutadiene sample that is produced by using anionic polymerization and has the same Mn.

The styrene, cis-1,4-linkage, trans-1,4-linkage, and vinyl-linkage contents of the polymer samples were determined using Fourier transform infrared spectroscopy, $^1$H-NMR spectroscopy (CDCl$_3$), or by $^{13}$C-NMR spectroscopy. The $^1$H- and $^{13}$C-NMR measurements were made on a 300 MHz Gemini 300 NMR Spectrometer System (Varian).

The glass transition temperature ($T_g$) was determined using a DSC 2910 Differential Scanning calorimeter (TA Instruments). The $T_g$ was determined as the temperature where an inflection point occurred in the heat capacity ($C_p$) change.

The storage modulus (G') was measured with an ARES-G2 rheometer (TA Instruments) in the torsion rectangular mode. The temperature was increased at a rate of 5° C. min$^{-1}$ from −115° C. to 100° C. The storage modulus (G') was obtained using a frequency of 10 Hz and a deformation of 0.25% from −115° C. to −10° C. and 2% from −10° C. to 100° C.

The wear resistance was measured with a Lambourn Abrasion tester (Ueshima Seisakusho Co.). Rubber test pieces were measured under three different torque values (0.8 Nm at 60 minutes, 1.1 Nm at 9 minutes, and 1.2 Nm at 7 minutes) and two different slip angles −10% at 3 minutes and −12% at 3 minutes). Constant conditions included a temperature of 60° C., a speed of 50 m/min, and a load of 35 N. The abrasion surface was 240-grit sandpaper. The weight loss of each composition was calculated, and the evaluation of abrasion was shown by index, regarding the loss quantity of Comparative Samples A-5, B-5, C-5, and D-5, each of which include no tapered styrene-butadiene copolymer, as 100. Larger index values correspond to improved wear resistance.

Example 1

The 19 liter polymerization reactor was equipped with a mechanical agitator (shaft and blades). The top of the reactor was connected to a reflux condenser system for conveying, condensing, and recycling the 1,3-butadiene vapor developed inside the reactor throughout the duration of the polymerization. The reactor was also equipped with a heating jacket.

Hexane (0.18 kg), styrene (0.36 kg of 31.8 wt % in hexane), and 1,3-butadiene (1.68 kg of 20.2 wt % in hexane) were charged into the reactor. SDBS (2.27 mL of 0.5 M in ethylbenzene) and n-butyl lithium (6.05 mL of 1.60 M in hexane) were then charged into the reactor. The reactor jacket was then heated to 60° C. After 24 minutes, the batch temperature peaked at 69° C. After an additional 2 hours, the batch temperature was cooled to 37° C. and the cement was removed from the reactor, coagulated in isopropanol containing butylated hydroxy toluene (BHT), and drum dried to yield a polymer with the following properties: $M_n$=52 kg/mol, $M_w$=55 kg/mol, polydispersity index (PDI=$M_w$/$M_n$)=1.05, $T_g$=−76.07° C., percent styrene=26.6% (38.7% of the styrene units in sequences containing more than three units; 10.9% of the styrene units in sequences containing more than ten units), vinyl=9.4%, and 1,4-butadiene incorporation of 64%; 39.4 weight percent of the butadiene units have a cis-microstructure and 49.6 weight percent of the butadiene units have a trans-microstructure.

Rubber compositions were prepared in accordance with the formulation shown in Tables 1 and 3 by kneading the components using a 250 ml BANBURY series tangential mixer (a product of HF MIXING GROUP) and a 3 inch roll. The obtained rubber compositions were vulcanized at 160° C. for 30 minutes, and the storage modulus (G') and wear resistance of the obtained vulcanizate were measured. The results are shown in Tables 2 and 4.

TABLE 1

| | Amount (php) | | | | |
|---|---|---|---|---|---|
| Ingredient | Sample A-1 | Sample A-2 | Sample A-3 | Sample A-4 | Comparative Sample A-5 |
| Master Batch | | | | | |
| Matrix styrene-butadiene copolymer | 100 | 100 | 100 | 100 | 100 |
| Tapered styrene-butadiene copolymer (Example 1) | 10 | 7.5 | 5 | 2.5 | 0 |
| Black oil (petroleum hydrocarbon mixture) | 0 | 2.5 | 5 | 7.5 | 10 |
| Carbon black N343 | 50 | 50 | 50 | 50 | 50 |
| Stearic acid | 2 | 2 | 2 | 2 | 2 |
| Microcrystalline wax blend | 2 | 2 | 2 | 2 | 2 |
| N-(1,3-dimethylbutyl)-N'-phenyl-p-phenylenediamine | 0.95 | 0.95 | 0.95 | 0.95 | 0.95 |
| Final Batch | | | | | |
| Sulfur | 1.5 | 1.5 | 1.5 | 1.5 | 1.5 |
| N-tert-butyl-2-benzothiazyl sulfonamide | 0.5 | 0.5 | 0.5 | 0.5 | 0.5 |
| Benzothiazyl disulfide | 0.5 | 0.5 | 0.5 | 0.5 | 0.5 |
| Diphenylguanidine | 0.3 | 0.3 | 0.3 | 0.3 | 0.3 |
| Zinc oxide | 2.5 | 2.5 | 2.5 | 2.5 | 2.5 |

TABLE 2

| Properties of Rubber Compositions | | |
|---|---|---|
| | G' | Wear Index |
| Comparative Sample A-5 | 3.6194 | 100 |
| Sample A-1 | 4.9528 (+37%) | 102 (+2%) |
| Sample A-2 | 3.9582 (+9%) | 103 (+3%) |
| Sample A-3 | 5.0680 (+40%) | 105 (+5%) |
| Sample A-4 | 3.9957 (+10%) | 103 (+3%) |

As can be seen in Table 2, use of the tapered styrene-butadiene copolymer of Example 1 as a full or partial oil replacement in rubber compositions that include carbon black as a filler resulted in improvements in wear resistance ranging from 2 to 5% and storage modulus ranging from 9 to 40%.

TABLE 3

| | Amount (php) | | | | |
|---|---|---|---|---|---|
| Ingredient | Sample B-1 | Sample B-2 | Sample B-3 | Sample B-4 | Comparative Sample B-5 |
| Master Batch | | | | | |
| Natural rubber (TSR20) | 20 | 20 | 20 | 20 | 20 |
| Matrix styrene-butadiene copolymer | 80 | 80 | 80 | 80 | 80 |
| Tapered styrene-butadiene copolymer (Example 1) | 10 | 7.5 | 5 | 2.5 | 0 |
| Black oil (petroleum hydrocarbon mixture) | 0 | 2.5 | 5 | 7.5 | 10 |
| Silica | 52.5 | 52.5 | 52.5 | 52.5 | 52.5 |
| Stearic acid | 2 | 2 | 2 | 2 | 2 |
| Microcrystalline wax blend | 2 | 2 | 2 | 2 | 2 |
| N-(1,3-dimethylbutyl)-N'-phenyl-p-phenylenediamine | 0.95 | 0.95 | 0.95 | 0.95 | 0.95 |
| Remill | | | | | |
| Silica | 2.5 | 2.5 | 2.5 | 2.5 | 2.5 |
| Bis(triethoxysilylpropyl) disulfide | 5 | 5 | 5 | 5 | 5 |
| Final Batch | | | | | |
| Sulfur | 1.5 | 1.5 | 1.5 | 1.5 | 1.5 |
| N-tert-butyl-2-benzothiazyl sulfonamide | 0.7 | 0.7 | 0.7 | 0.7 | 0.7 |
| Benzothiazyl disulfide | 2 | 2 | 2 | 2 | 2 |
| Diphenylguanidine | 1.4 | 1.4 | 1.4 | 1.4 | 1.4 |
| Zinc oxide | 2.5 | 2.5 | 2.5 | 2.5 | 2.5 |

TABLE 4

| Properties of Rubber Compositions | | |
|---|---|---|
| | G' | Wear Index |
| Comparative Sample B-5 | 8.8597 | 100 |
| Sample B-1 | 9.7353 (+10%) | 112 (+12%) |
| Sample B-2 | 9.5062 (+7%) | 108 (+8%) |
| Sample B-3 | 9.3297 (+5%) | 110 (+10%) |
| Sample B-4 | 10.172 (+15%) | 104 (+4%) |

As can be seen in Table 4, use of the tapered styrene-butadiene copolymer of Example 1 as a full or partial oil replacement in rubber compositions that include silica as a filler resulted in improvements in wear resistance ranging from 8 to 12% and storage modulus ranging from 5 to 15%.

Example 2

The 19-liter polymerization reactor was equipped with a mechanical agitator (shaft and blades). The top of the reactor was connected to a reflux condenser system for conveying, condensing, and recycling the 1,3-butadiene vapor developed inside the reactor throughout the duration of the polymerization. The reactor was also equipped with a heating jacket.

Hexane (0.30 kg), styrene (0.55 kg of 32.9 wt % in hexane), and 1,3-butadiene (2.72 kg of 20 wt % in hexane) were charged into the reactor. SDBS (3.63 mL of 0.5 M in ethylbenzene) and n-butyl lithium (9.07 mL of 1.60 M in hexane) were then charged into the reactor. The reactor jacket was then heated to 66° C. After 20 minutes, the batch temperature peaked at 107° C. After an additional 40 minutes, the batch temperature was cooled to 46° C. and the cement was removed from the reactor, coagulated in isopropanol containing butylated hydroxy toluene (BHT), and drum dried to yield a polymer with the following properties: $M_n$=66 kg/mol, $M_w$=74 kg/mol, polydispersity index (PDI=$M_w/M_n$)=1.12, $T_g$=−78.79° C., percent styrene=25.7% (48.6% of the styrene units in sequences containing greater than three units; 17.5% of the styrene units in sequences containing greater than ten units), vinyl=9.7%, and 1,4-butadiene incorporation of 64%; 38.5 weight percent of the butadiene units have a cis-microstructure and 50.1 weight percent of the butadiene units have a trans-microstructure.

Rubber compositions were prepared in accordance with the formulation shown in Tables 5 and 7 by kneading the components using a 250 ml BANBURY series tangential mixer (a product of HF MIXING GROUP) and a 3 inch roll. The obtained rubber compositions were vulcanized at 160° C. for 30 minutes, and the storage modulus (G') and wear resistance of the obtained vulcanizate were measured. The results are shown in Tables 6 and 8.

TABLE 5

| | Amount (php) | | | | |
|---|---|---|---|---|---|
| Ingredient | Sample C-1 | Sample C-2 | Sample C-3 | Sample C-4 | Comparative Sample C-5 |
| Master Batch | | | | | |
| Matrix styrene-butadiene copolymer | 100 | 100 | 100 | 100 | 100 |
| Tapered styrene-butadiene copolymer (Example 2) | 10 | 7.5 | 5 | 2.5 | 0 |
| Black oil (petroleum hydrocarbon mixture) | 0 | 2.5 | 5 | 7.5 | 10 |
| Carbon black N343 | 50 | 50 | 50 | 50 | 50 |
| Stearic acid | 2 | 2 | 2 | 2 | 2 |
| Microcrystalline wax blend | 2 | 2 | 2 | 2 | 2 |
| N-(1,3-dimethylbutyl)-N'-phenyl-p-phenylenediamine | 0.95 | 0.95 | 0.95 | 0.95 | 0.95 |
| Final Batch | | | | | |
| Sulfur | 1.5 | 1.5 | 1.5 | 1.5 | 1.5 |
| N-tert-butyl-2-benzothiazyl sulfonamide | 0.5 | 0.5 | 0.5 | 0.5 | 0.5 |
| Benzothiazyl disulfide | 0.5 | 0.5 | 0.5 | 0.5 | 0.5 |
| Diphenylguanidine | 0.3 | 0.3 | 0.3 | 0.3 | 0.3 |
| Zinc oxide | 2.5 | 2.5 | 2.5 | 2.5 | 2.5 |

TABLE 6

Properties of Rubber Compositions

| | G' | Wear Index |
|---|---|---|
| Comparative Sample C-5 | 4.3934 | 100 |
| Sample C-1 | 4.4795 (+2%) | 106 (+6%) |
| Sample C-2 | 4.7440 (+8%) | 103 (+3%) |
| Sample C-3 | 4.7926 (+9%) | 98 (−2%) |
| Sample C-4 | 4.4240 (+1%) | 100 (NC) |

As can be seen in Table 6, use of the tapered styrene-butadiene copolymer of Example 2 as a full or partial oil replacement in rubber compositions that include carbon black as a filler resulted in improvements in wear resistance ranging from 3 to 6% and storage modulus ranging from 1 to 9%.

TABLE 7

| | Amount (php) | | | | |
|---|---|---|---|---|---|
| Ingredient | Sample D-1 | Sample D-2 | Sample D-3 | Sample D-4 | Comparative Sample D-5 |
| Master Batch | | | | | |
| Natural rubber (TSR20) | 20 | 20 | 20 | 20 | 20 |
| Matrix styrene-butadiene copolymer | 80 | 80 | 80 | 80 | 80 |
| Tapered styrene-butadiene copolymer (Example 2) | 10 | 7.5 | 5 | 2.5 | 0 |
| Black oil (petroleum hydrocarbon mixture) | 0 | 2.5 | 5 | 7.5 | 10 |
| Silica | 52.5 | 52.5 | 52.5 | 52.5 | 52.5 |
| Stearic acid | 2 | 2 | 2 | 2 | 2 |
| Microcrystalline wax blend | 2 | 2 | 2 | 2 | 2 |
| N-(1,3-dimethylbutyl)-N'-phenyl-p-phenylenediamine | 0.95 | 0.95 | 0.95 | 0.95 | 0.95 |
| Remill | | | | | |
| Silica | 2.5 | 2.5 | 2.5 | 2.5 | 2.5 |
| Bis(triethoxysilylpropyl) disulfide | 5 | 5 | 5 | 5 | 5 |
| Final Batch | | | | | |
| Sulfur | 1.5 | 1.5 | 1.5 | 1.5 | 1.5 |
| N-tert-butyl-2-benzothiazyl sulfonamide | 0.7 | 0.7 | 0.7 | 0.7 | 0.7 |
| Benzothiazyl disulfide | 2 | 2 | 2 | 2 | 2 |
| Diphenylguanidine | 1.4 | 1.4 | 1.4 | 1.4 | 1.4 |
| Zinc oxide | 2.5 | 2.5 | 2.5 | 2.5 | 2.5 |

TABLE 8

Properties of Rubber Compositions

| | G' | Wear Index |
|---|---|---|
| Comparative Sample D-5 | 9.4791 | 100 |
| Sample D-1 | 10.610 (+12%) | 122 (+22%) |
| Sample D-2 | 10.110 (+7%) | 120 (+20%) |
| Sample D-3 | 9.0876 (−4%) | 112 (+12%) |
| Sample D-4 | 8.8337 (−7%) | 104 (+4%) |

As can be seen in Table 8, use of the tapered styrene-butadiene copolymer of Example 2 as a full or partial oil replacement in rubber compositions that include silica as a filler resulted in improvements in wear resistance ranging from 4 to 22% and storage modulus ranging from 7 to 12%.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A styrene-butadiene copolymer comprising:
   a total styrene content of 20 to 30 percent by weight of the styrene-butadiene copolymer;
   a total butadiene content of 70 to 80 percent by weight of the styrene-butadiene copolymer;
   a content of styrene sequences having greater than 3 styrene units is greater than 30 weight percent of the total styrene content; and a content of styrene sequences having greater than 10 styrene units is less than 20 weight percent of the total styrene content,
wherein the styrene-butadiene copolymer has a number average molecular weight of 30,000 to 80,000.

2. The styrene-butadiene copolymer of claim 1, wherein the total styrene content is 22 to 27 percent by weight of the styrene-butadiene copolymer and the total butadiene content is 73 to 78 percent by weight of the styrene-butadiene copolymer.

3. The styrene-butadiene copolymer of claim 1, wherein the content of styrene sequences having greater than 3 styrene units is 35 to 50 weight percent of the total styrene content.

4. The styrene-butadiene copolymer of claim 1, wherein the content of styrene sequences having greater than 10 styrene units is 8 to 18 weight percent of the total styrene content.

5. The styrene-butadiene copolymer of claim 1, wherein the styrene-butadiene copolymer has a glass transition temperature of −80° C. to −70° C.

6. The styrene-butadiene copolymer of claim 1, wherein the styrene-butadiene copolymer has a molecular weight distribution (Mw/Mn) of 1.0 to 1.2.

7. The styrene-butadiene copolymer of claim 1, wherein the copolymer is prepared by copolymerizing styrene and butadiene in a hydrocarbon solvent in the presence of an organolithium initiator and sodium dodecylbenzenesulfonate.

8. A rubber composition for a tire comprising:
a rubber component;
1 to 20 phr of the styrene-butadiene copolymer of claims 1;
30 to 100 phr of a reinforcing filler; and
up to 10 phr of a process oil,
wherein the rubber composition has a storage modulus G' measured at 0.1% strain and 30° C. of 4 to 15 MPa.

9. The rubber composition for a tire of claim 8, wherein the storage modulus G' is 8 to 11 MPa.

10. A first rubber composition for a tire comprising:
a rubber component;
1 to 15 phr of the styrene-butadiene copolymer of claims 1;
30 to 100 phr of a reinforcing filler; and
up to 10 phr of a process oil,
wherein the first rubber composition has a storage modulus G' at least 5% greater than a storage modulus G' of a second rubber composition having the same composition as the first rubber composition except for the styrene-butadiene copolymer of claim 1.

11. The first rubber composition of claim 10, wherein the storage modulus G' of the first rubber composition is at least 20% greater than the storage modulus G' of the second rubber composition.

12. A rubber composition for a tire comprising a rubber component;
1 to 15 phr of the styrene-butadiene copolymer of claims 1;
30 to 100 phr of a reinforcing filler; and
up to 10 phr of a process oil,
wherein the rubber composition has a wear rate measured at 50 m/min and 35 N of 0.07 to 0.09 mg/m.

13. A first rubber composition for a tire comprising:
a rubber component;
1 to 15 phr of the styrene-butadiene copolymer of claims 1;
30 to 100 phr of a reinforcing filler; and
up to 10 parts by weight of a process oil,
wherein the first rubber composition has a wear resistance at least 5% greater than a wear resistance of a second rubber composition having the same composition as the first rubber composition except for the styrene-butadiene copolymer of claim 1.

14. A styrene-butadiene copolymer comprising:
a total styrene content of 20 to 30 percent by weight of the styrene-butadiene copolymer;
a total butadiene content of 70 to 80 percent by weight of the styrene-butadiene copolymer;
a content of styrene sequences having greater than 3 styrene units is greater than 30 weight percent of the total styrene content; and
a content of styrene sequences having greater than 10 styrene units is 8 to less than 20 weight percent of the total styrene content.

15. The styrene-butadiene copolymer of claim 14, wherein the total styrene content is 22 to 27 percent by weight of the styrene-butadiene copolymer and the total butadiene content is 73 to 78 percent by weight of the styrene-butadiene copolymer.

16. The styrene-butadiene copolymer of claim 14, wherein the content of styrene sequences having greater than 3 styrene units is 35 to 50 weight percent of the total styrene content.

17. The styrene-butadiene copolymer of claim 14, wherein the content of styrene sequences having greater than 10 styrene units is 8 to 18 weight percent of the total styrene content.

18. The styrene-butadiene copolymer of claim 14, wherein the styrene-butadiene copolymer has a glass transition temperature of −80° C. to −70° C.

19. The styrene-butadiene copolymer of claim 14, wherein the styrene-butadiene copolymer has a molecular weight distribution (Mw/Mn) of 1.0 to 1.2.

20. The styrene-butadiene copolymer of claim 14, wherein the copolymer is prepared by copolymerizing styrene and butadiene in a hydrocarbon solvent in the presence of an organolithium initiator and sodium dodecylbenzenesulfonate.

* * * * *